United States Patent
Ikeda et al.

(10) Patent No.: US 8,499,746 B2
(45) Date of Patent: Aug. 6, 2013

(54) INTERNAL COMBUSTION ENGINE USING ELECTROMAGNETIC WAVE RADIATION TO ACTIVATE BURNT GAS

(75) Inventors: Yuji Ikeda, Kobe (JP); Takashi Furui, Kobe (JP)

(73) Assignee: Imagineering, Inc., Kobe-shi, Hyogo (JP)

( * ) Notice: Subject to any disclaimer, the term of this patent is extended or adjusted under 35 U.S.C. 154(b) by 545 days.

(21) Appl. No.: 12/668,767

(22) PCT Filed: Jul. 12, 2008

(86) PCT No.: PCT/JP2008/062641
§ 371 (c)(1),
(2), (4) Date: Jan. 12, 2010

(87) PCT Pub. No.: WO2009/008523
PCT Pub. Date: Jan. 15, 2009

(65) Prior Publication Data
US 2010/0180871 A1     Jul. 22, 2010

(30) Foreign Application Priority Data
Jul. 12, 2007   (JP) .................................. 2007-183765

(51) Int. Cl.
*F02B 51/00*    (2006.01)
(52) U.S. Cl.
USPC ........... 123/536; 123/537; 123/538; 123/539; 123/605; 123/606; 123/143 B; 123/620
(58) Field of Classification Search
USPC .............. 123/536–539, 605, 606, 143 B, 620
See application file for complete search history.

(56) References Cited

U.S. PATENT DOCUMENTS

| | | | |
|---|---|---|---|
| 3,934,566 A | * | 1/1976 | Ward .............................. 123/275 |
| 4,043,308 A | * | 8/1977 | Cerkanowicz ............ 123/143 R |
| 4,138,980 A | | 2/1979 | Ward |
| 4,403,504 A | * | 9/1983 | Krage et al. ................. 73/114.29 |
| 4,556,020 A | * | 12/1985 | Hickling .................... 123/143 B |

(Continued)

FOREIGN PATENT DOCUMENTS

| | | |
|---|---|---|
| DE | 10251664 A1 | 5/2004 |
| EP | 1567825 A1 | 8/2005 |

(Continued)

OTHER PUBLICATIONS

International Search Report of PCT/JP2008/062641, mailing date of Sep. 30, 2008.

*Primary Examiner* — Marguerite McMahon
*Assistant Examiner* — James Kim
(74) *Attorney, Agent, or Firm* — Westerman, Hattori, Daniels & Adrian, LLP

(57) ABSTRACT

There is provided an internal-combustion engine that allows plasma to be used safely, efficiently, and in a manner conducive to resource conservation. An internal-combustion engine having an intake valve for opening and closing a combustion chamber, the internal-combustion engine comprising a valve-driving mechanism for driving the intake valve; and a plasma-generating device positioned within a region containing gas used for combustion during a combustion stroke, the plasma-generating device being composed of an antenna and a microwave-generating device, wherein the plasma-generating device composed of the antenna and the microwave-generating device generates plasma at a timing intimately associated with a state of openness of the intake valve in response to the driving of the valve by the valve-driving mechanism.

7 Claims, 4 Drawing Sheets

U.S. PATENT DOCUMENTS

| | | | |
|---|---|---|---|
| 5,027,764 A * | 7/1991 | Reimann | 123/143 B |
| 5,845,480 A * | 12/1998 | DeFreitas et al. | 60/776 |
| 6,422,002 B1 * | 7/2002 | Whealton et al. | 60/275 |
| 6,986,342 B2 * | 1/2006 | Thomas | 123/536 |
| 7,392,795 B2 * | 7/2008 | Nagamine et al. | 123/536 |
| 7,827,954 B2 * | 11/2010 | Nagasawa et al. | 123/143 B |
| 2004/0173165 A1 * | 9/2004 | Sieber et al. | 123/3 |
| 2005/0241699 A1 * | 11/2005 | Kragl et al. | 137/554 |
| 2007/0137611 A1 * | 6/2007 | Yu et al. | 123/304 |

FOREIGN PATENT DOCUMENTS

| | | |
|---|---|---|
| JP | 51-77719 A | 7/1976 |
| JP | 64-036981 A | 2/1989 |
| JP | 2005-098226 A | 4/2005 |
| JP | 2006-504959 A | 2/2006 |
| JP | 2007-009778 A | 1/2007 |
| JP | 2007-113570 A | 5/2007 |
| WO | 2004/042318 A1 | 5/2004 |

* cited by examiner

INTERNAL COMBUSTION ENGINE USING ELECTROMAGNETIC WAVE RADIATION TO ACTIVATE BURNT GAS

TECHNICAL FIELD

The description relates to gas preparation for preparing a gas to be used for combustion in an internal-combustion engine and to an internal-combustion engine in which a gas prepared using the gas preparation is combusted.

BACKGROUND OF THE INVENTION

Techniques for using plasma to improve the fuel in an internal-combustion engine have been investigated.

For example, an internal-combustion engine in which the fuel is reformed using a plasma electrode is disclosed in Patent Document 1. In this internal-combustion engine, the fuel is introduced into a fuel-reforming vessel, and the fuel is reformed by a plasma electrode provided therein and ejected by an injector.

An internal-combustion engine provided with a fuel-reforming mechanism in which exhaust gas recirculation (EGR) is employed is disclosed in Patent Document 2. In this internal-combustion engine, a part of the exhaust gas from a three-way catalyst is added to the fuel, and the fuel is lightened using a plasma reactor composed of a mesh electrode and returned to the combustion chamber.

[Patent Document 1] Japanese Laid-open Patent Application No. 2007-09778

[Patent Document 2] Japanese Laid-open Patent Application No. 2005-98226

SUMMARY OF THE INVENTION

In the internal-combustion engine disclosed in Patent Document 1, the fuel-reforming chamber must be provided separately, and problems are presented in that the installation space is enlarged. Storing fuel that has been reformed and made more combustible also presents safety problems. Additionally, a long period time passes before the reformed fuel is actually combusted, and the high chemical activity that was conferred may be impaired.

In the internal-combustion engine disclosed in Patent Document 2, operation must occur at a theoretical air-fuel ratio in order for the internal-combustion engine to function, which runs counter to the current technological trend in internal-combustion engines for advancing lean-burning for the sake of resource conservation. The mesh electrode also impedes the flow channel for exhaust gas recirculation, and the efficiency of supplying exhaust gas is impaired.

An internal-combustion engine is provided that allows plasma to be used safely, efficiently, and in a manner conducive to resource conservation. Plasma is not used in the internal-combustion engine according to the present invention to reform fuel but to reform air, which is an oxidizing agent, into a more chemically-active form, and to combust this air.

According to a first aspect, an internal-combustion engine has an intake valve for opening and closing a combustion chamber, the internal-combustion engine comprising: a driving mechanism for driving the intake valve; and a plasma generator positioned within a region containing gas used for combustion during a combustion stroke, wherein the plasma generator generates plasma at a timing intimately associated with a state of openness of the intake valve in response to the driving of the valve by the driving mechanism.

According to a second aspect, an internal-combustion engine has an exhaust valve for opening and closing a combustion chamber, the internal-combustion engine comprising: a driving mechanism for driving the exhaust valve; and a plasma generator positioned within a region containing gas used for combustion during a combustion stroke in which back-flow into the combustion chamber is accomplished via the exhaust valve, wherein the plasma generator generates plasma at a timing intimately associated with a state of openness of the exhaust valve in response to the driving of the valve by the driving mechanism.

According to a third aspect, the internal-combustion engine of the first aspect is preferably configured such that the plasma is generated at a timing that starts when exhausting concludes and ends before the intake starts, and is set according to a valve-timing setting in the driving mechanism; and the plasma generator produces plasma using the timing.

According to a fourth aspect, the internal-combustion engine of the first aspect is preferably configured to further comprise: an actual valve opening detector, wherein the timing for generating plasma is determined according to a detection value outputted by the actual valve opening detector; and the plasma generator produces plasma according to the timing.

According to a fifth aspect, the internal-combustion engine of the first aspect is preferably configured such that the plasma generator comprises: a discharge electrode positioned in the region containing the gas to be used in the combustion stroke; and an electromagnetic-wave radiation source for radiating an electromagnetic pulse toward the discharge electrode using according to the timing, the electromagnetic pulse having a frequency in the GHz band.

According to a sixth aspect, the internal-combustion engine of the fifth aspect is preferably configured such that the duration of the electromagnetic pulse is approximately one microsecond or less.

According to a seventh aspect, the internal-combustion engine of the first aspect is preferably configured such that the internal-combustion engine of is of a type in which intake gas and residual gas are mixed in the combustion chamber; and the plasma generator generates plasma during a period occurring from the start of the opening stroke of the intake valve until the intake valve has begun to open.

According to a eighth aspect, the internal-combustion engine of the first aspect is preferably configured to further comprise: an exhaust-gas recirculation mechanism for capturing exhaust gas at a stage just downstream from the exhaust valve, wherein the plasma generator is disposed within the exhaust gas recirculation mechanism and generates plasma during a period in which the intake valve is open.

According to a ninth aspect, the internal-combustion engine of the eighth aspect is preferably configured such that the exhaust-gas recirculation mechanism takes up water within the exhaust gas.

According to a tenth aspect, the internal-combustion engine of the first aspect is preferably configured to further comprise a spark plug and an antenna, wherein the spark plug and the antenna are disposed just upstream of the combustion chamber; and a working fluid subjected to the effect of the plasma is introduced into the combustion chamber.

According to an eleventh aspect, the internal-combustion of the first aspect is preferably configured to further comprise: a plurality of intake ports or exhaust ports provided to the combustion chamber, a spark plug and an antenna, wherein the spark plug and the antenna are disposed so as to correspond to the respective ports or are disposed so as to correspond to ports selected from among the ports.

According to a twelfth aspect, the internal-combustion engine of the first aspect is preferably configured to further comprise: a plurality of spark plugs and antennas.

In the internal-combustion engine, gas that has previously burnt in the internal-combustion engine is treated using plasma. The plasma treatment stimulates the activity of chemical species in the gas, particularly oxidizing agents. The activated chemical species are unstable. The lifetime of some of the species in the mixture is on the order of milliseconds.

The plasma activation of the chemical species is performed according to the state in which the intake valve is driven, whereby active chemical species can be efficiently produced according to an optimal intake stroke timing, and the burnt gas can be treated, which is conducive to improving the efficiency and safety of supplied gas for the combustion.

When discharge plasma formed by a discharge electrode is irradiated with electromagnetic waves, the discharge plasma receives the energy of the electromagnetic waves and grows and enlarges. Plasma can be obtained on a large scale in this system without mesh electrodes or the like being provided over the entire flow channel. In other words, the gas flow channel is not obstructed, and the plasma can be used to efficiently treat the burnt gas.

If generated for roughly one microsecond or less, the plasma will be in a so-called non-equilibrium state for the majority of the period during the lifetime. In other words, the electrical temperature and the gas temperature are divergent. The activation efficiency of chemical species is higher in plasma in a non-equilibrium state (referred to below as "non-equilibrium plasma") than in plasma in a state of thermal equilibrium (referred to below as "thermal-equilibrium plasma"). Ozone and hydroxy (OH) radicals can be generated in large amounts, particularly when non-equilibrium plasma is generated in air. In other words, according to this configuration, plasma is used to reform oxidizing agents, allowing the activity of the oxidizing agents to be increased, which stimulates combustion.

Large amounts of water are contained in the residual gas in an internal-combustion engine of the so-called internal exhaust-gas recirculation type. When plasma is used to treat water, OH radicals are produced. The water in the residual gas is treated using plasma just before the intake stroke starts, whereby OH radicals can be mixed into the gas to be combusted in the following combustion stroke. This operation is performed just before the intake valve opens, and therefore back-firing can be safely prevented.

The mass of the intake valve fluctuates when fuel adheres thereto, or when the adhering fuel flows away into the combustion chamber. Fuel that adheres or flows away can be oxidized and lightened by highly active chemical species if plasma treatment is performed using the timing Situations in which excessive amounts of fuel are unexpectedly present during combustion when starting or at other times can thereby be addressed. The fuel adhering to the intake valve can also be used to exert operational effects similar to the effects of the exhaust gas recirculation.

Large amounts of water are included in the exhaust gas introduced during intake in exhaust gas recirculation. This water is used to produce OH radicals that can contribute to combustion. In other words, combustion can be efficiently performed in this internal-combustion engine by using plasma to reform oxidizing agents.

In other words, there can be provided an internal-combustion engine that allows plasma to be used safely, efficiently, and in a manner conducive to resource conservation.

DETAILED DESCRIPTION OF THE INVENTION

Embodiments of the present invention will be described below with reference to the drawings.

First Embodiment

Figure 1:
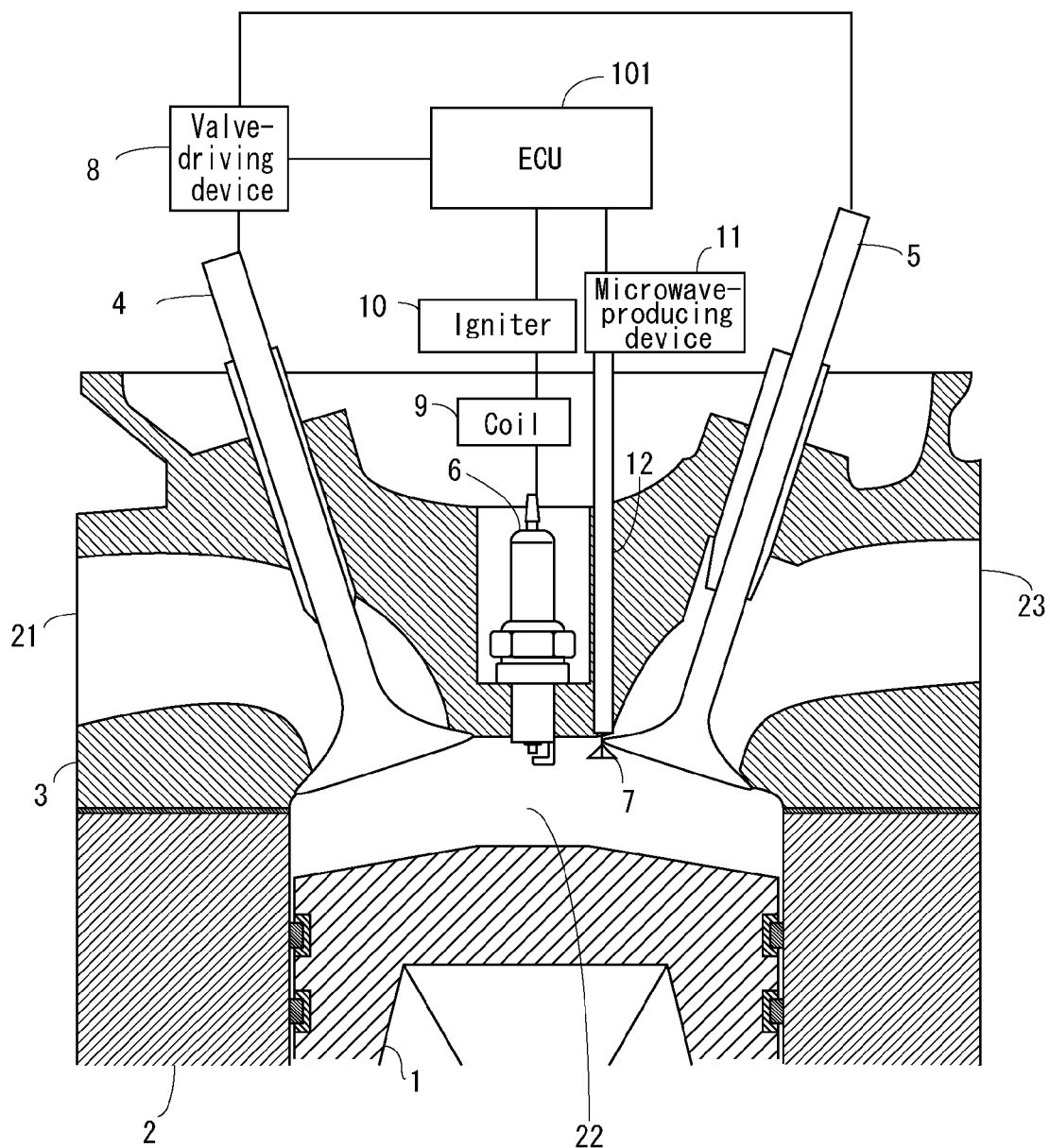
FIG. 1 is a cross-sectional view that shows the configuration of an internal-combustion engine according to a first embodiment of the present invention.

FIG. 1 is a cross-sectional view that shows the configuration of an internal-combustion engine according to a first embodiment of the present invention.

The internal-combustion engine according to the first embodiment of the present invention has a combustion chamber 22 that is configured from a piston 1, a cylinder liner 2, and an engine head 3, as shown in FIG. 1.

A spark plug 6 for igniting the fuel mixture and an antenna 7 for generating plasma in the fuel mixture or in the burnt gas within the combustion chamber 22 are also provided to the combustion chamber 22.

In the combustion chamber 22, an intake valve 4 opens, whereby fresh gas is taken in, and an exhaust valve 5 opens, whereby burnt gas is discharged. The intake valve 4 and the exhaust valve 5 are opened and closed by a valve-driving device 8.

A constant spatial volume is maintained in the combustion chamber 22 even when the piston 1 is at top dead center, and therefore a portion of the burnt gas remains even after the completion of the exhaust step.

A control device (ECU) 101 controls the timing of the opening and closing of the intake valve 4 and the exhaust valve 5 via the valve-driving device 8, controls the timing of the discharge of the spark plug 6 via a coil 9 and an igniter 10, and controls the timing of the generation of microwaves from the antenna 7 via a microwave-producing device 11.

Figure 4:
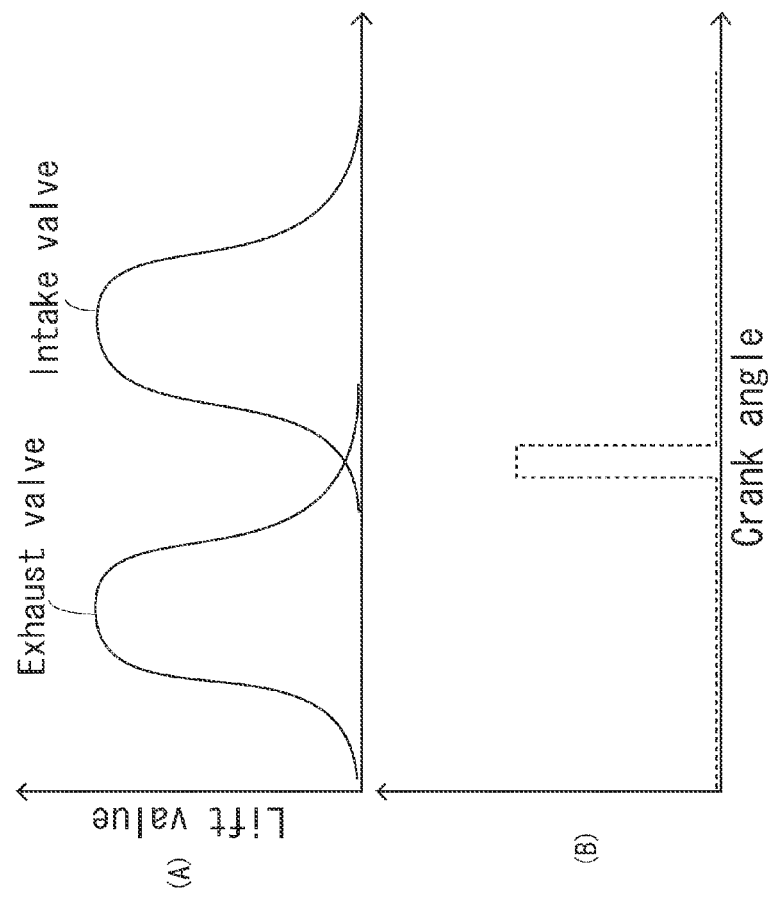
FIG. 4 is a time chart that shows the timing at which microwaves are generated in the internal-combustion engine according to the present invention.

FIG. 4 is a time chart that shows the timing at which microwaves are generated in the internal-combustion engine according to the present invention.

The antenna 7 generates microwaves timed after exhausting concludes and before intake begins, and activates the burnt gas remaining in the combustion chamber 22, as shown in FIG. 4.

The timing of the production of microwaves is determined according to valve-control parameters set in the control device (ECU) 101.

Second Embodiment

Figure 2:
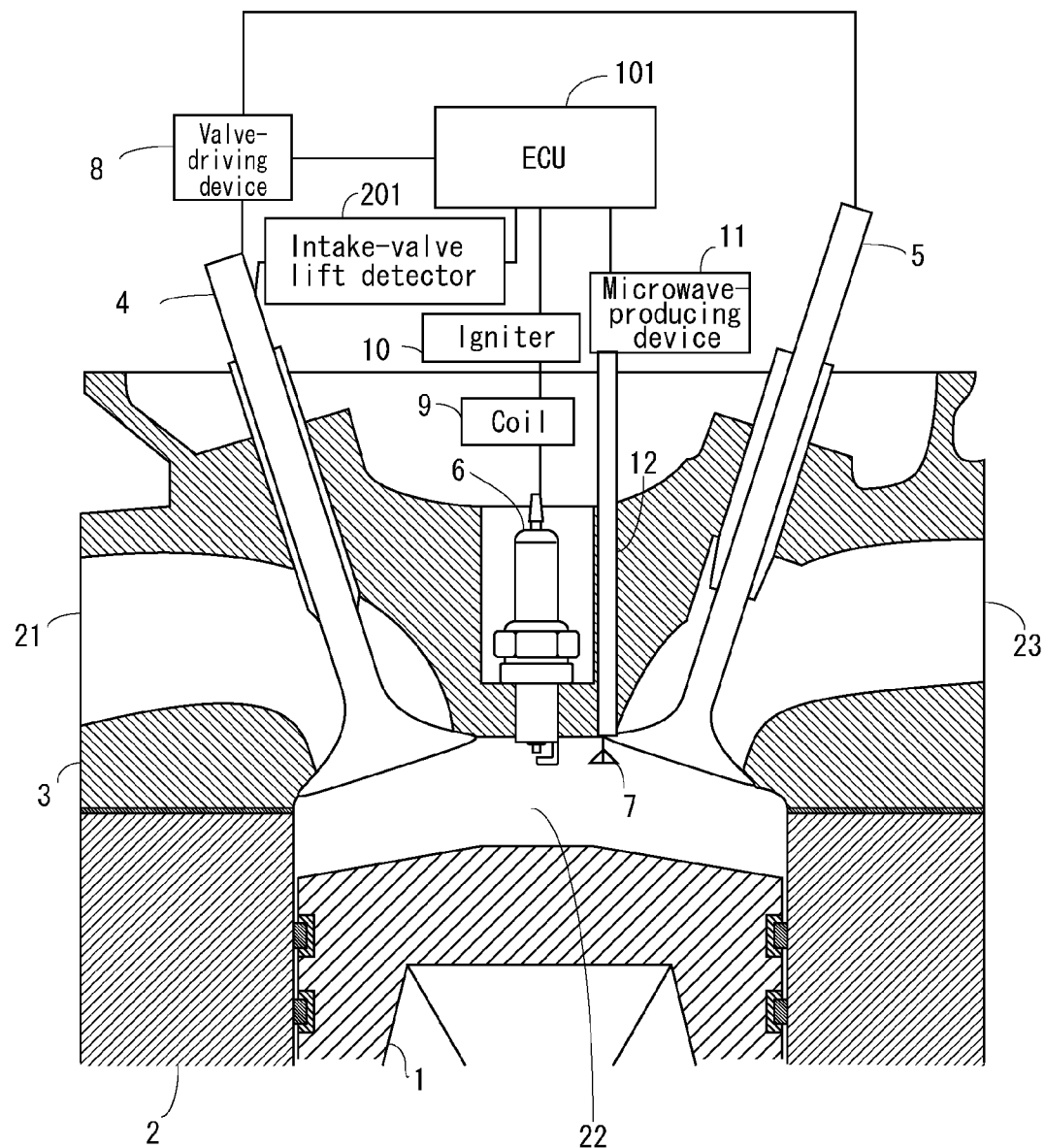
FIG. 2 is a cross-sectional view that shows the configuration of an internal-combustion engine according to a second embodiment of the present invention.

FIG. 2 is a cross-sectional view that shows the configuration of an internal-combustion engine according to a second embodiment of the present invention.

The internal-combustion engine according to the second embodiment of the present invention has an intake-valve lift detector 201, as shown in FIG. 2. The intake-valve lift detector 201 may be an eddy-current displacement gauge or a laser-Doppler displacement gauge. The intake-valve lift detector 201 detects the amount of lift (opening state) of the intake valve 4 and sends a detection signal to the control device (ECU) 101.

The antenna 7 generates microwaves timed after exhausting concludes and before intake begins, and activates the burnt gas remaining in the combustion chamber 22, a shown in FIG. 4.

The timing of the generation of microwaves is determined in the control device (ECU) 101 according to the output of the intake-valve lift detector 201. Control can thereby be prevented from deteriorating due to individual variability in the amount of valve lift, aging deterioration, and abnormal lift.

Third Embodiment

Figure 3:
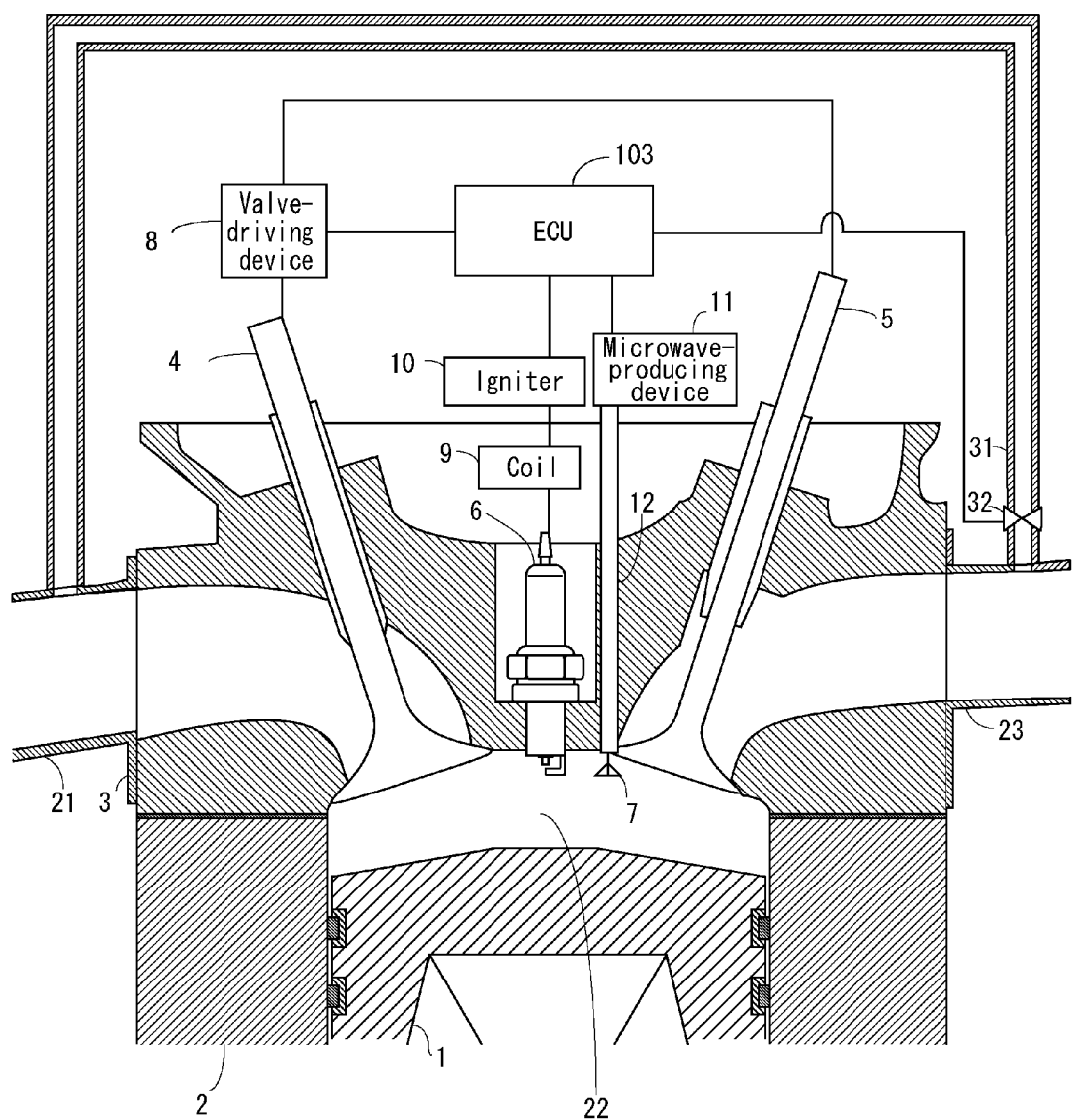
FIG. 3 is a cross-sectional view that shows the configuration of an internal-combustion engine according to a third embodiment of the present invention.

FIG. 3 is a cross-sectional view that shows the configuration of an internal-combustion engine according to a third embodiment of the present invention.

The internal-combustion engine according to the third embodiment has an exhaust-gas recirculation mechanism, as shown in FIG. 3. This internal-combustion engine is such that so-called external exhaust gas recirculation; i.e., feeding back combustion exhaust gas toward an intake port 21, is used to reduce the combustion temperature. The combustion exhaust gas is fed back via an exhaust port 23 and through a conducting pipe 31 toward the intake port 21. The flow volume of the conducting pipe 31 is controlled by an on-off valve 32. The on-off valve 32 is controlled by the control device (ECU) 101.

The rest of the configurations are identical to the configuration of the first embodiment.

The concentration of burnt gas is high in this embodiment, and therefore plasma may also be generated even after intake commences. The exhaust-gas recirculation mechanism may also take up the water within the exhaust.

In the present invention, as described above, burnt gas is efficiently activated by plasma, and the chemical species in the gas will have high oxidative capability in all cases. This operation facilitates combustion of the mixture during the combustion stroke, and stabilizes the combustion. The present invention thus succeeds in improving output and reducing emissions.

Other Embodiments

In the first and second embodiments above, examples in which the spark plug 6 and the antenna 7 were disposed with the combustion chamber were given, but the present invention is not limited to this configuration. A variety of configurations are possible for the spark plug 6 and the antenna 7 as long as these components are within a region containing the gas used for combustion during the combustion stroke. The spark plug 6 and the antenna 7 may be disposed, e.g., just upstream of the combustion chamber, whereby a working fluid that has been subjected to the effects of plasma may be introduced into the combustion chamber. The spark plug 6 and the antenna 7 may also be positioned just upstream of the combustion chamber or just downstream of the combustion chamber and driven at those positions, whereby plasma is produced within the combustion chamber.

Configurations are also possible in which the exhaust gas discharged from the exhaust port in the internal-combustion engine is made to flow back into the combustion chamber, whereby an effect similar to exhaust gas recirculation is obtained. The spark plug 6 and the antenna 7 may also be positioned near the exhaust port in such internal-combustion engines. "Near the exhaust port" here means at a region containing back-flowing exhaust gas. The region need not be within the combustion chamber and may also be downstream of the exhaust port. When exhaust gas is caused to flow back, the exhaust valve is opened even during the initiation of the intake step. The amount of lift of the exhaust valve and not of the intake valve is therefore detected when introducing exhaust gas into the combustion chamber using this system, and plasma may be generated according to the amount of lift. Other than the difference relating to the intake valve and the exhaust valve, the spark plug 6 and the antenna 7 may be controlled in substantially the same manner as in the aforedescribed embodiments.

A configuration for treating back-flowing exhaust gas may be combined with one of the configurations for plasma treatment according to the embodiments above. The internal-combustion engine may therefore be provided with both of these configurations. The exhaust gas and the intake gas or exhaust gas recirculation may be treated simultaneously or in predetermined staggered intervals. The timing of treatment may be selected appropriately according to the operational state of the internal-combustion engine and to the timing of the opening and closing of the intake and exhaust valves accompanying that state.

In the case of an internal-combustion engine in which a plurality of intake ports or exhaust ports are provided to the combustion chamber in the embodiments and modifications above, the spark plug 6 and the antenna 7 may be disposed so as to correspond to all of the ports or may be disposed so as to correspond to selected ports.

A plurality of the positioned spark plugs 6 and antennas 7 may also be provided. A variety of shapes and forms can be used for the antenna, these shapes and forms not being provided by way of limitation in the embodiments above.

The combustion of the internal-combustion engine itself is not limited to spark ignition but may also be started by compression ignition or autoignition. The spark plug 6 may discharge an amount of energy less than that required for ignition in such cases.

The spark plug 6 was given as an example of a plasma generator in the embodiments and modifications above, but the present invention is not limited to this configuration. Plasma can also be generated using a variety of well-known methods and devices not limited to spark discharge. The generation method, system, or device is not limited as long as plasma is properly generated.

The antenna used for radiating electromagnetic waves may also be, e.g., an aperture antenna such as a horn antenna. When possible, the shape and material of the gas flow channel may be configured so that the gas flow channel itself is the waveguide or doubles as the aperture antenna. The antenna may also be configured having a radiating element composed of an element connected to a source for generating electromagnetic waves, and a reflector for reflecting the electromagnetic waves from the radiating element. The antenna may also be configured having a radiating element as well as vanes or resonant elements acting as a medium for the electromagnetic waves radiating from the radiating element.

A variety of combinations are possible for the relationship between the number of regions to be irradiated by electromagnetic waves and the number of antennas. Electromagnetic waves from a plurality of antennas or a plurality of antenna elements may be irradiated on a single target region. Moreover, in cases where a plurality of regions having strong electric fields are formed in a space, as with an antenna provided with elements having an electrical length of, e.g., ¾ of a wavelength or more, a plurality of regions to be irradiated by electromagnetic waves may be set for each antenna according to the number of regions having strong electric fields. The charged particles that lead to the formation of plasma may also be prepared in the plurality of set regions, and plasma may be formed simultaneously in a plurality of regions.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

The invention claimed is:

1. An internal-combustion engine, comprising:
   an intake valve for opening and closing a combustion chamber;
   an exhaust valve for opening and closing the combustion chamber;
   a driving mechanism for driving both the intake valve and the exhaust valve;
   a control device; and
   a plasma generator positioned within a region containing gas used for combustion during a combustion stroke, the plasma generator comprising
   a discharge electrode positioned in the region containing the gas to be used in the combustion stroke; and
   an electromagnetic-wave radiation source for radiating an electromagnetic pulse towards the discharge electrode,
   wherein the control device instructs electromagnetic-wave radiation source to radiate the electromagnetic pulse at any point during a timing that starts when exhausting concludes and ends before the intake starts, and is set according to a valve-timing setting in the driving mechanism, thereby activating burnt gas remaining in the combustion chamber after combustion, and
   wherein the electromagnetic pulse has a frequency in the GHz band and the duration of the electromagnetic pulse is approximately one microsecond or less.

2. The internal-combustion engine according to claim 1, further comprising:
   an actual valve opening detector,
   wherein the control unit controls the plasma generator according to timing determined according to a detection value outputted by the actual valve opening detector.

3. The internal-combustion engine according to claim 1,
   wherein the internal-combustion engine of is of a type in which intake gas and residual gas are mixed in the combustion chamber.

4. The internal-combustion engine according to claim 1, further comprising:
   an exhaust-gas recirculation mechanism for capturing exhaust gas at a stage just downstream from the exhaust valve and transporting the exhaust gas to a position upstream of the intake valve.

5. The internal-combustion engine according to claim 4, wherein the exhaust-gas recirculation mechanism takes up water within the exhaust gas.

6. The internal-combustion engine according to claim 1, further comprising a plurality of intake ports or exhaust ports provided to the combustion chamber,
   wherein the discharge electrode is a spark plug,
   wherein the electromagnetic-wave radiation source is an antenna,
   wherein the spark plug and the antenna are disposed so as to correspond to the respective ports or are disposed so as to correspond to ports selected from among the ports.

7. The internal-combustion engine according to claim 1, further comprising:
   a plurality of spark plugs and antennas.

* * * * *